(12) United States Patent  
Huang et al.

(10) Patent No.: US 8,804,350 B2  
(45) Date of Patent: Aug. 12, 2014

(54) CONTROL DEVICE FOR USE IN WOVEN ARTICLE

(75) Inventors: Hong-Hsu Huang, Taipei (TW); I-Chen Su, Taipei (TW); Shun-Tung Yang, Taipei (TW)

(73) Assignee: King's Metal Fiber Technologies Co., Ltd., Taichung (TW)

( * ) Notice: Subject to any disclaimer, the term of this patent is extended or adjusted under 35 U.S.C. 154(b) by 137 days.

(21) Appl. No.: 13/589,207

(22) Filed: Aug. 20, 2012

(65) Prior Publication Data

US 2014/0049889 A1 Feb. 20, 2014

(51) Int. Cl.  
*H05K 1/00* (2006.01)

(52) U.S. Cl.  
USPC ............ 361/750; 361/751; 361/679.02

(58) Field of Classification Search  
USPC .................... 361/750, 751, 679.02  
See application file for complete search history.

(56) References Cited

U.S. PATENT DOCUMENTS

2011/0289654 A1* 12/2011 Williams et al. ............ 2/167  
2013/0190052 A1* 7/2013 Lundell ..................... 455/566

* cited by examiner

*Primary Examiner* — Andargie M Aychillhum  
(74) *Attorney, Agent, or Firm* — Bacon & Thomas, PLLC

(57) ABSTRACT

Disclosed is a control device for use in woven article, which includes a conductive fabric that includes conductive warps, conductive wefts, and insulation warps, which are arranged so as to form a plurality of conduction sites; a first woven flat cable, which includes a plurality of conductor lines, the first woven flat cable being set to overlap the conductive fabric, two of the conductor lines being electrically and respectively connected to the conductive warp and the conductive weft of one of the conduction sites; and a processor unit, to which the conductor lines of the first woven flat cable is electrically connected.

8 Claims, 6 Drawing Sheets

CONTROL DEVICE FOR USE IN WOVEN ARTICLE

FIELD OF THE INVENTION

The present invention relates to a control device, and in particular to a control device that is arranged in a woven article, such as clothes, trousers, and skirts to control the operation of an electronic device.

BACKGROUND OF THE INVENTION

Various electronic devices that are currently available in the market are small in size and light in weight to allow easy carrying by users for convenient use at any location in any time. To operate such electronic devices, the users must first take out these devices from the pockets of clothes, trousers, and skirts or purses or bags and, after the operation, these devices are put back again. This causes certain inconveniences that can be improved.

In view of such a problem, some manufactures provide a control device on woven articles, such as clothes, trousers, and skirts, and the control device is electrically connected to an electronic device. When a user wishes to operate the electronic device, the user uses a finger to actuate the control device in order to gain control of the operation of the electronic device (such as playing back music or stopping playing), without any inconvenience of first taking out the electronic device.

However, such a conventional control device is bulky and rigid. Attaching such a device to the flexible woven article worn on the people would cause certain discomfort. This has long been an issue to be addressed.

Thus, the present invention aims to provide a solution to the problem discussed above.

SUMMARY OF THE INVENTION

An object of the present invention is to provide a control device for use in a woven article, in which a conductive fabric and a woven flat cable unit are uniquely designed to be flexible and are set to overlap each other for selective conduction so as to make a control device that is suitable for use in various woven articles because of being thin and compact in size and flexibility so that a user, when wearing a woven article t which the control device is mounted, does not feel uncomfortable due to the small size and flexibility.

Another object of the present invention is to provide a control device for use in a woven article, in which with the unique arrangement of a conductive fabric and a woven flat cable unit and the connecting relationship therebetween, a number of conduction sites can be simultaneously formed to serve as switches so that controls of multiple operations can be realized.

To achieve the above objects, the present invention provides a control device for use in woven article, which comprises: a conductive fabric, a woven flat cable unit, and a processor unit. The conductive fabric comprises a plurality of conductive warps, a plurality of conductive wefts, and a plurality of insulation warps. The insulation warps are arranged between the conductive warps and the conductive wefts. The conductive warps are selectively set in electrical engagement with the conductive wefts to form a plurality of conduction sites. The woven flat cable unit comprises at least one first woven flat cable, which comprises a plurality of conductor lines. The first woven flat cable is set to overlap the conductive fabric. Two of the conductor lines are respectively and electrically connected to the conductive warp and the conductive weft of one of the conduction sites of the conductive fabric. The processor unit is electrically connected to the conductor lines of the first woven flat cable.

In this way, a control device suitable for a woven article is provided, which is thin and small in size and is flexible as a woven article, so that when wearing a woven article to which the control device is mounted, a user may not feel uncomfortable due to the small size and flexibility.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 3:
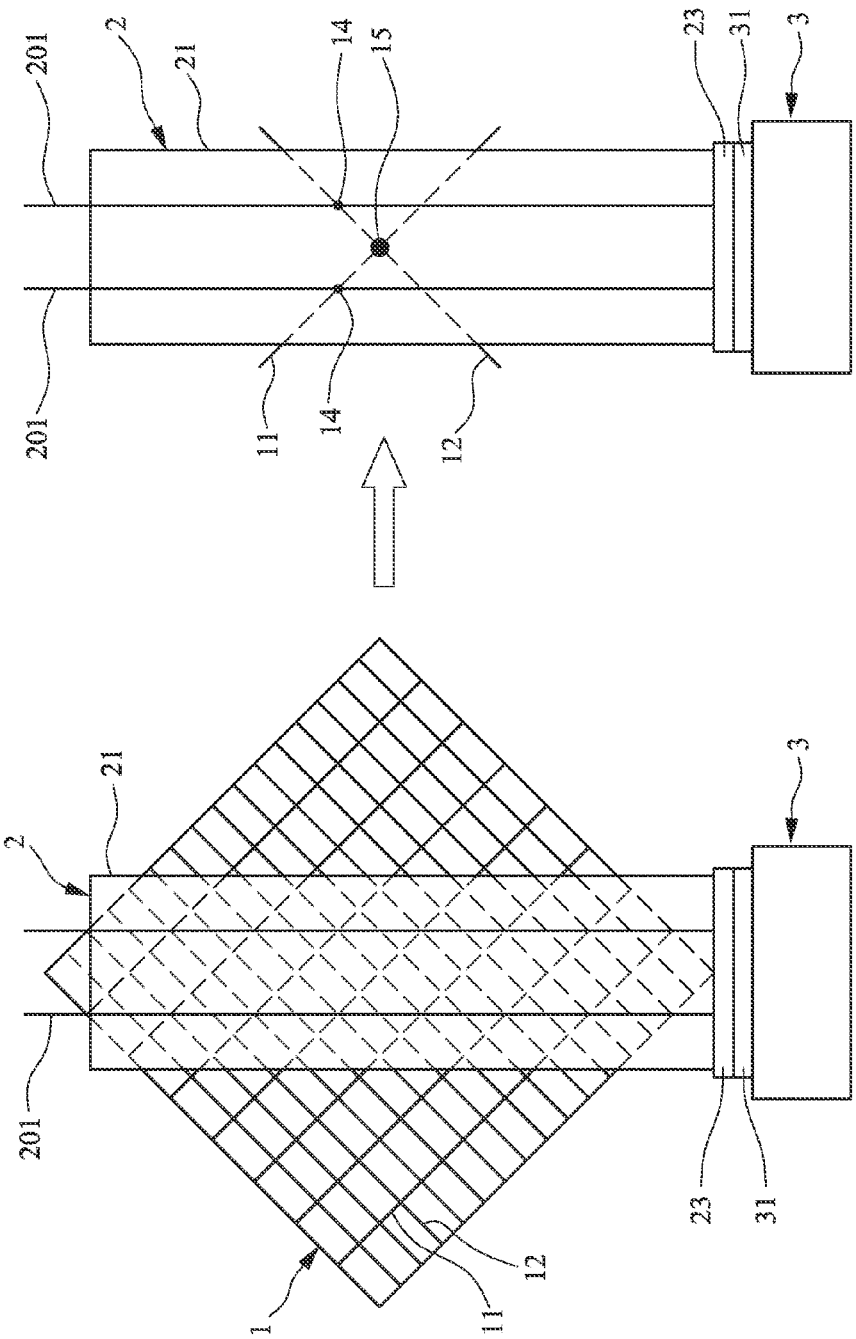
FIG. 3 is a plan view showing a control device according to a first embodiment of the present invention.
Figure 4:
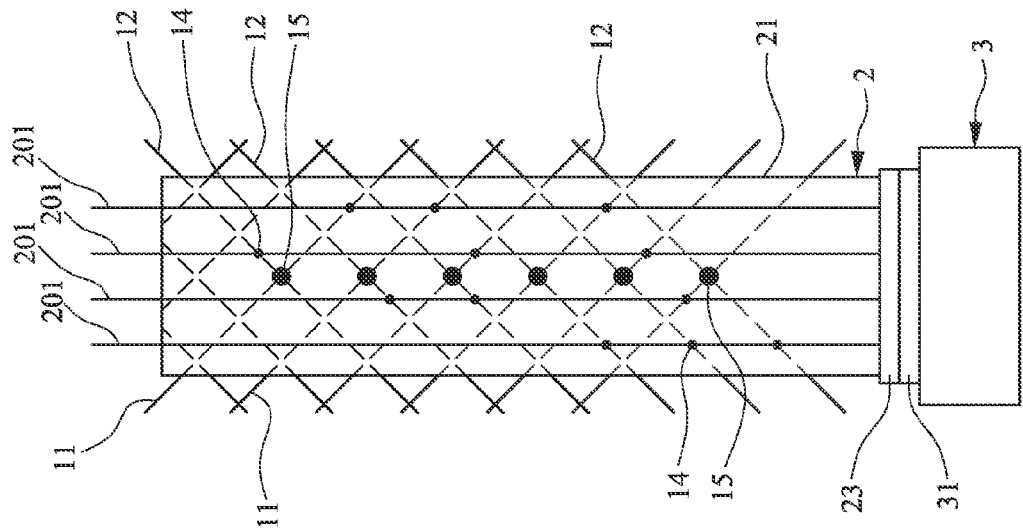
FIG. 4 is a plan view showing a control device according to a second embodiment of the present invention.
Figure 5:
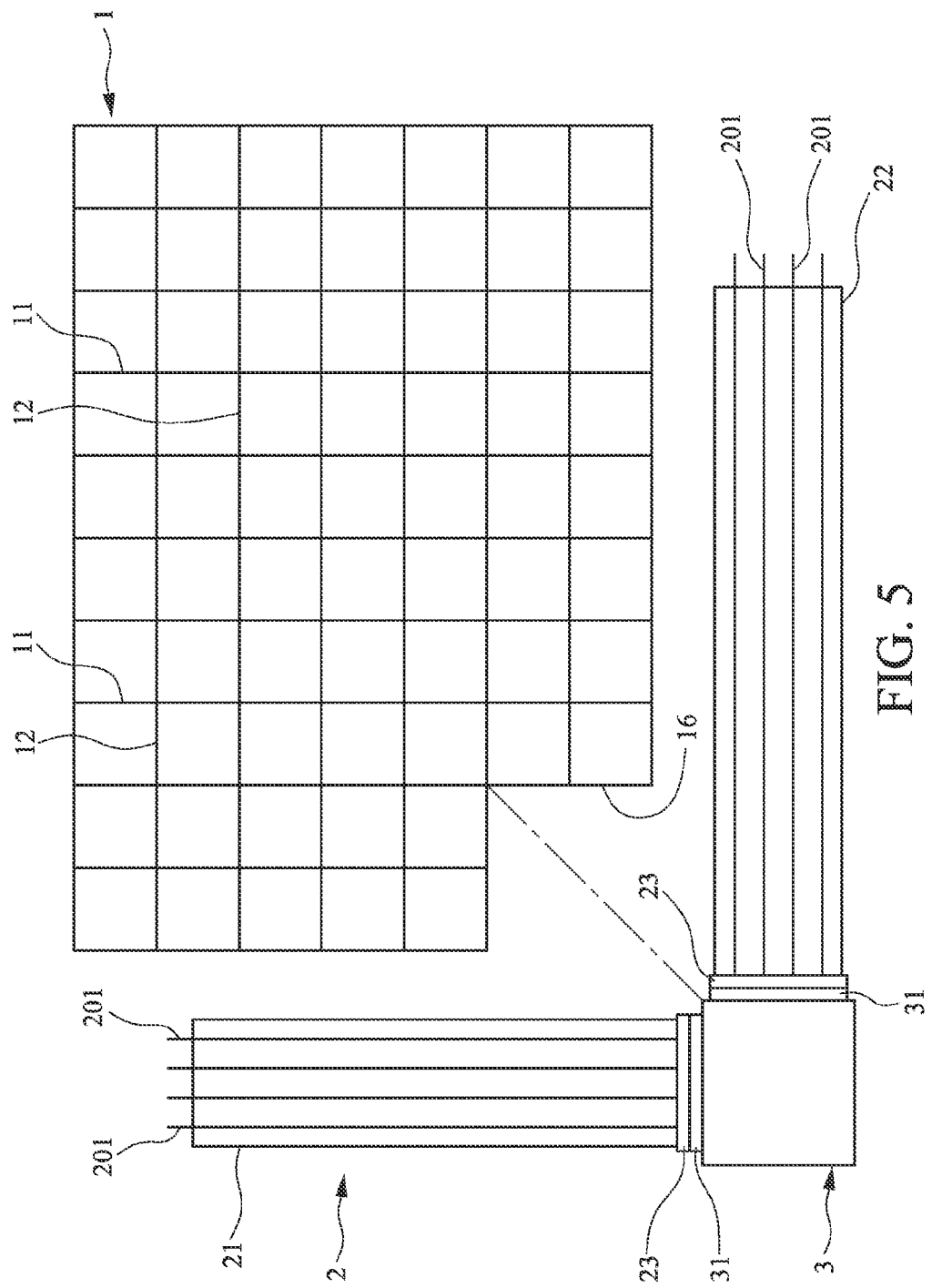
FIG. 5 is a plan view showing a control device according to a third embodiment of the present invention before being assembled.
Figure 6:
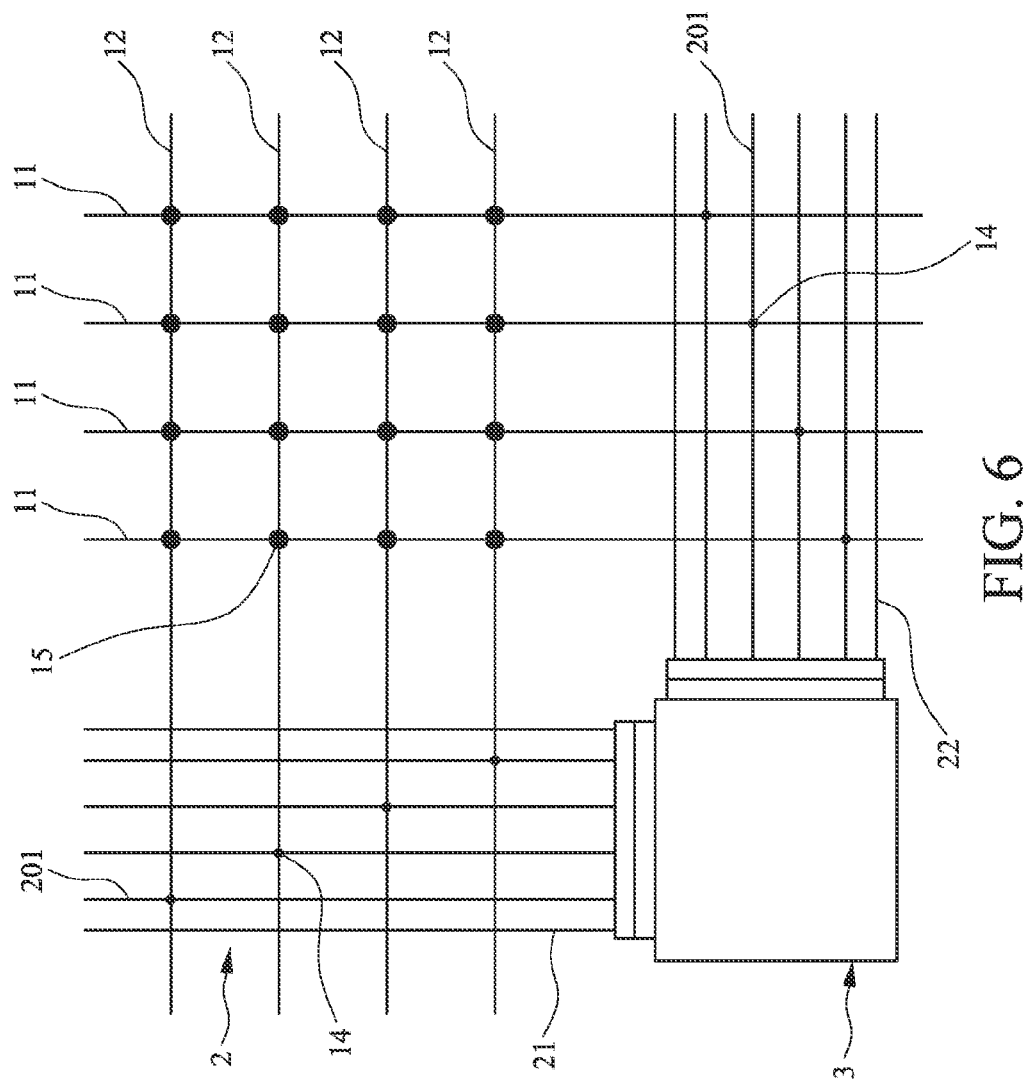
FIG. 6 is a plan view showing a control device according to a third embodiment of the present invention after being assembled.

The present invention provides a control device for use in a woven article, which can be arranged in a woven article, such as clothes, trousers, and skirts, to be actuated and controlled by being pressed down by a finger. FIGS. 3 and 4 respectively show first and second embodiments according to the present invention and FIGS. 5 and 6 shows a third embodiment of the present invention.

The control device comprises a flexible conductive fabric 1, a flexible woven flat cable unit 2, and a processor unit 3.

Figure 1:
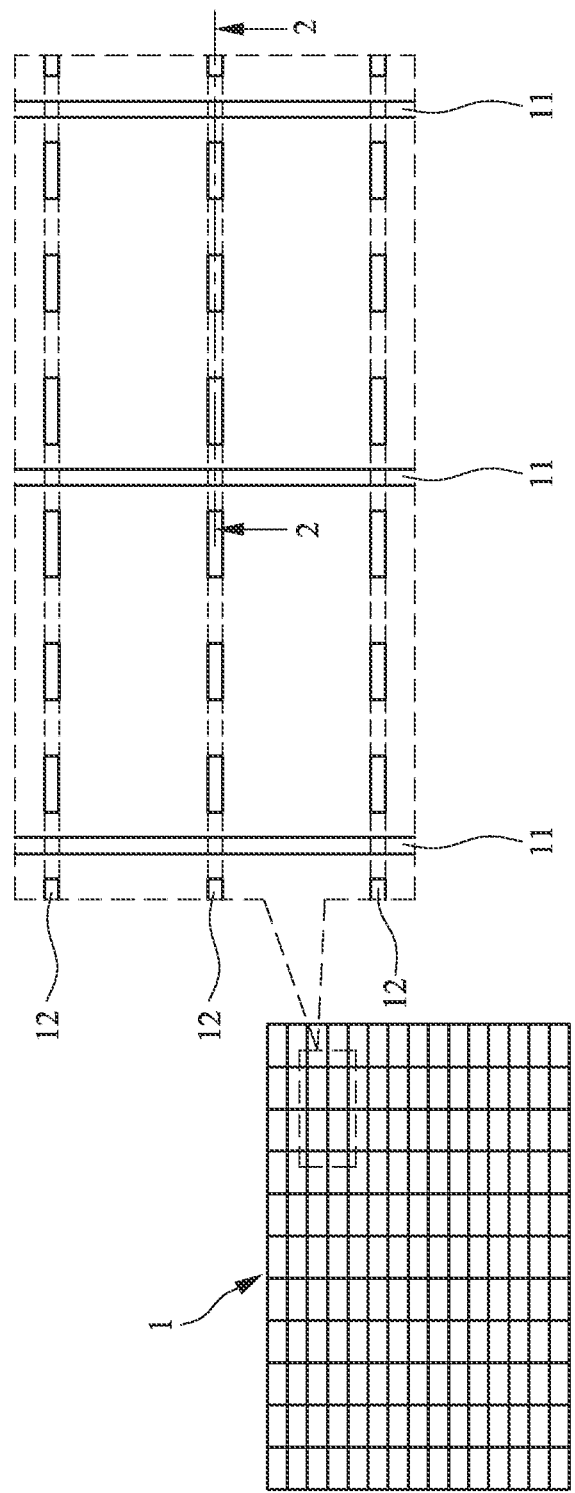
FIG. 1 is a plan view showing a conductive fabric according to the present invention, an enlarged view of a portion of the conductive fabric being also illustrated, insulation yarns (including insulation warps and insulation wefts) being not shown.
Figure 2:
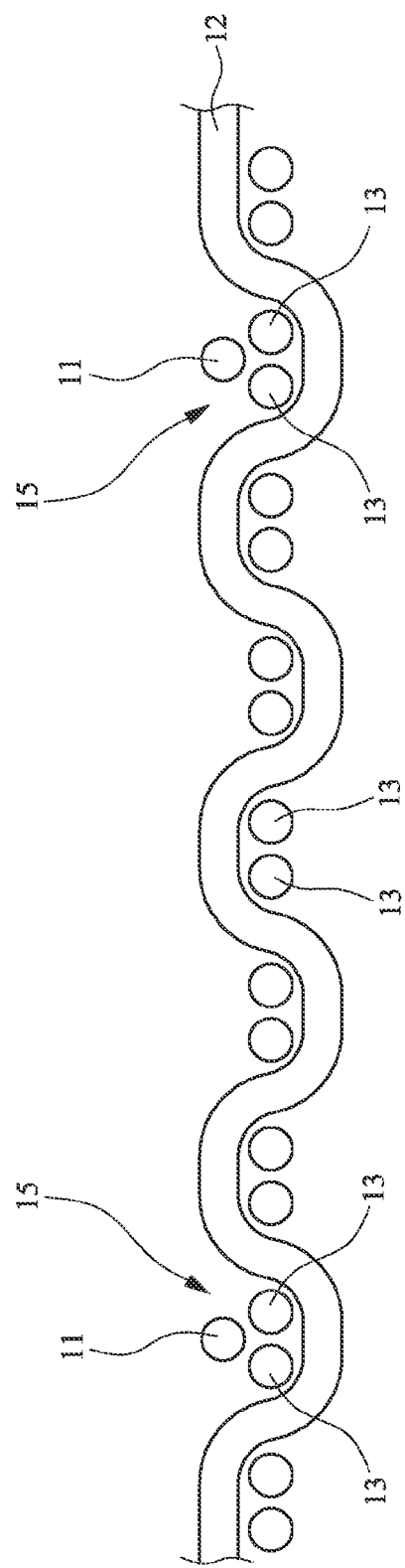
FIG. 2 is a cross-sectional view taken along line 2-2 of FIG. 1, the insulation wefts of the insulation yarns being not shown.

Referring to FIGS. 1 and 2, the conductive fabric 1 comprises a plurality of conductive warps 11, a plurality of conductive wefts 12, and a plurality of insulation yarns (including a plurality of insulation warps 13 and a plurality of insulation wefts; for purpose of making the drawings easily readable, the insulation yarns being omitted in FIG. 1 and the insulation wefts being omitted in FIG. 2). The insulation yarns are arranged between the conductive warps 11 and the conductive wefts 12, as shown in FIG. 2. Each of the conductive wefts 12 successively passes between any two adjacent insulation warps 13 alternatively through upper and lower sides thereof. Each of the conductive warps 11 is set above and between two adjacent insulation warps 13 below which the conductive weft 12 extends so as to constitute a conduction site 15. Taking a single conduction site 15 as an example, when a finger presses down the conductive warp 11, the conductive warp 11 pushes the insulation warps 13 located there below sideways to the let and right sides respectively (not illustrated) to allow the conductive warp 11 to electrically engage the conductive weft 12 thereby establishing electrical connection therebetween. In other words, the conduction site 15 becomes conducted in this way. When the finger is removed, the conductive warp 11 and the two insulation wefts 13 will be return to the original positions thereof by elasticity thereof.

Referring to the first embodiment of the present invention shown in FIG. 3, the right-hand side portion of FIG. 3 is a simplified drawing of the left-hand side drawing. The right-hand side drawing of FIG. 3 shows only one conductive warp 11 and one conductive weft 12 of the conductive fabric 1 that intersect each other. The woven flat cable unit 2 comprises at least one first woven flat cable 21 (one first woven flat cable being shown in FIG. 3). The first woven flat cable 21 comprises a plurality of conductor lines 201 that is not mutually interfering with each other. The first woven flat cable 21 is arranged to overlap the conductive fabric 1 and any two of the conductor lines 201 are respectively and electrically connected to the conductive warp 11 and the conductive weft 12 of each conduction site 15 to thereby form two electrical connections 14 as shown in the right-hand side portion of FIG. 3. In other words, using a finger to press the conduction site 15 shown in the right-hand side drawing of FIG. 3 allows the conductive warp 11 and the conductive weft 12 of the conduction site 15 to electrically engage each other (see FIG. 2). As shown in FIG. 3, the first woven flat cable 21 comprises two conductor lines 201, and the conductive warp 11 and the conductive weft 12 of each conduction site 15 are respectively and electrically connected to the two conductor lines 201.

Electrical connection between the conductor lines 201 and the conductive warp 11 or the conductive weft 12 can be done in various ways, such as sewing made with thin conductor lines or piercing with piercing terminals, both being effective in forming the electrical connections 14.

The processor unit 3 can be a micro control unit (MCU) or an electronic device having similar functionality. The processor unit 3 is electrically connected to the conductor lines 201 of the first woven flat cable 21.

Thus, the conduction site 15 functions as a switch, whereby when a finger presses down the conduction site 15, conduction is established between the two conductor lines 201 so that a control signal (such as a play-back signal or a stop signal) can be issued from the processor unit 3. In other words, is a signal output terminal (not shown) of the processor unit 3 is further connected to an electronic product, then the controls signal may control the operation of the electronic product (such as playing back or stopping playing).

In a practical application, the control device according to the present invention can be arranged on a woven article, such as clothes, trousers, and skirts (not shown). In attempting to control the operation of the electronic product, a finger can simply make a movement of pressing down.

Referring to a second embodiment shown in FIG. 4, in the instant embodiment, the first woven flat cable 21 comprises four conductor lines 201, of which any two conductor lines 201 are respectively and electrically connected to the conductive warp 11 and the conductive weft 12 of any one of the conduction sites 15. In other words, since the first woven flat cable 21 comprises four conductor lines 201, the electrical connections of the conductive warps 11 and the conductive wefts 12 can be done with six combinations (see FIG. 4): (1-2) the conductive weft 12 connected to the first conductor line counting from left to right and the conductive warp 11 connected to the second conductor line so as to correspond to the first conduction site 15 counting from bottom to top; (1-3) the conductive weft 12 connected to the first conductor line and the conductive warp 11 connected to the third conductor line so as to correspond to the second conduction site 15; (1-4) the conductive weft 12 connected to the first conductor line and the conductive warp 11 connected the fourth conductor line so as to correspond to the third conduction site 15; (2-3) the conductive wefts 12 connected to the second conductor line and the conductive warps 11 connected to the third conductor line so as to correspond to the fourth conduction site 15; (2-4) the conductive weft 12 connected to the second conductor line and the conductive warp 11 connected to the fourth conductor line so as to correspond to the fifth conduction site 15; and (3-4) the conductive weft 12 connected to the third conductor line and the conductive warp 11 connected to the fourth conductor line so as to correspond to the sixth conduction site 15.

Thus, the control device according to the second embodiment of the present invention comprises six conduction sites 15, so as to provide six controllable press-down switches. It is apparent that the first woven flat cable 21 can be provided with more conductor lines 201 so as to obtain more switches.

Further, in the above discussed first and second embodiments according to the present invention, (1) the first woven flat cable 21 is set to overlap the conductive fabric 1 in an inclined manner (see FIG. 3) so that the conductor lines 201 of the first woven flat cable 21 are not parallel to the conductive warps 11 and the conductive wefts 12 of the conductive fabric 1 and (2) the processor unit 3 and the first woven flat cable 21 may be respectively and electrically coupled with an electrical connector 31 and a counterpart connector 23. The counterpart connector 23 is mateable with the electrical connector 31, so that the electrical connector 31 and the counterpart connector 23 are electrically connectable to each other in a releasable manner.

Referring to a third embodiment according to the present invention shown in FIGS. 5 and, in the instant embodiment, the woven flat cable unit 2 further comprises at least one second woven flat cable 22 (one second woven flat cable being shown in FIGS. 5 and 6) that comprises a plurality of conductor lines 201. The conductor lines 201 of the first and second woven flat cables 21, 22 are electrically connected to the processor unit 3. The first and second woven flat cables 21, 22 are set to overlap the conductive fabric 1 in a non-inclined manner so that the conductor lines 201 of the first woven flat cable 21 are parallel to the conductive warps 11 of the conductive fabric 1 and the conductor lines 201 of the second woven flat cable 22 are parallel to the conductive wefts 12 of the conductive fabric 1. Each of the conductor lines 201 of the first woven flat cable 21 is electrically connected to the conductive wefts 12 at multiple ones of the conduction sites 15 and each of the conductor lines 201 of the second woven flat cable 22 is electrically connected to the conductive warps 11 at multiple ones of the conduction sites 15.

In the third embodiment of the present invention, the conductive fabric 1 forms a cutoff 16 as shown in FIG. 5 and the processor unit 3 is set in the cutoff 16 (see FIG. 6). Further, in the third embodiment of the present invention, the processor unit 3 can be further electrically coupled with at least two electrical connectors 31. The first and second woven flat cables 21, 22 may be respectively coupled to counterpart connectors 23 that are mateable with said two electrical connector 31, whereby the counterpart connectors 23 of the first and second woven flat cables 21, 22 are respectively and electrically connected to the two electrical connectors 31 of the processor unit 3 in a releasable manner.

In summary, when applied a woven article, the control device according to the present invention shows the following advantages. The conductive fabric 1 and the woven flat cable unit 2 are uniquely designed to be flexible and are set to overlap each other for selective conduction so as to make a control device that is suitable for use in various woven articles because of being thin and compact in size and flexibility so that a user, when wearing a woven article t which the control device is mounted, does not feel uncomfortable due to the small size and flexibility. Further, with unique arrangement of the conductive fabric 1 and the woven flat cable unit 2 and the connecting relationship therebetween, a number of conduction sites 15 can be simultaneously formed to serve as switches so that controls of multiple operations can be realized.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A control device for use in woven article, comprising: a conductive fabric, which comprises a plurality of conductive warps, a plurality of conductive wefts, and a plurality of insulation warps, the insulation warps being arranged between the conductive warps and the conductive wefts, the conductive warps being selectively and releasably set in electrical engagement with the conductive wefts to form plurality of conduction sites; and a woven flat cable unit, which comprises at least one first woven flat cable, the first woven flat cable comprising a plurality of conductor lines, the first woven flat cable being set to overlap the conductive fabric, two of the conductor lines being respectively and electrically connected to the conductive warp and the conductive weft of one of the conduction sites of the conductive fabric; and a processor unit, which is electrically connected to the conductor lines of the first woven flat cable, wherein the woven flat cable unit further comprises at least one second woven flat cable that comprise a plurality of conductor lines, the conductor lines of the first and second woven flat cables being electrically connected to the processor unit, the first and second woven flat cables being set to overlap the conductive fabric, one of the conductor lines of the first woven flat cable being electrically connected to the conductive wefts of multiple ones of the conduction sites of the conductive fabric, one of the conductor lines of the second woven flat cable being electrically connected to the conductive warps of multiple ones of the conduction sites of the conductive fabric, wherein the conductive fabric forms a cutoff in which the processor unit is received.

2. The control device for use in woven article as claimed in claim 1, wherein the first woven flat cable overlaps the conductive fabric in an inclined manner so that the conductor lines of the first woven flat cable are not parallel to the conductive warps and the conductive wefts of the conductive fabric.

3. The control device for use in woven article as claimed in claim 1, wherein the first woven flat cable comprises two conductor lines, which are respectively and electrically connected to the conductive warp and the conductive weft of one of the conduction sites of the conductive fabric.

4. The control device for use in woven article as claimed in claim 1, wherein the first woven flat cable comprises four conductor lines, two of the four conductor lines being respectively and electrically connected to the conductive warp and the conductive weft of one of the conduction sites of the conductive fabric.

5. The control device for use in woven article as claimed in claim 1, wherein the processor unit and the first woven flat cable are respectively and electrically coupled with an electrical connector and a counterpart connector, the counterpart connector being mateable with the electrical connector, whereby the electrical connector and the counterpart connector are electrically connectable to each other in a releasable manner.

6. The control device for use in woven article as claimed in claim 1, wherein the first and second woven flat cables overlap the conductive fabric in a non-inclined manner.

7. The control device for use in woven article as claimed in claim 6, wherein the conductor lines of the first woven flat cable are parallel to the conductive warps or the conductive wefts of the conductive fabric, while the conductor lines of the second woven flat cable are parallel to the conductive wefts or the conductive warps of the conductive fabric.

8. The control device for use in woven article as claimed in claim 1, wherein the processor unit is electrically coupled with at least two electrical connectors, the first and second woven flat cables being further coupled with counterpart connectors mateable with the two electrical connectors, the counterpart connectors of the first and second woven flat cables are respectively and electrically connectable with the two electrical connectors of the processor unit in a releasable manner.

* * * * *